May 15, 1945.　　E. E. EICKMEYER ET AL　　2,375,903
FLUID DISPENSING APPARATUS
Filed July 10, 1939　　9 Sheets-Sheet 7

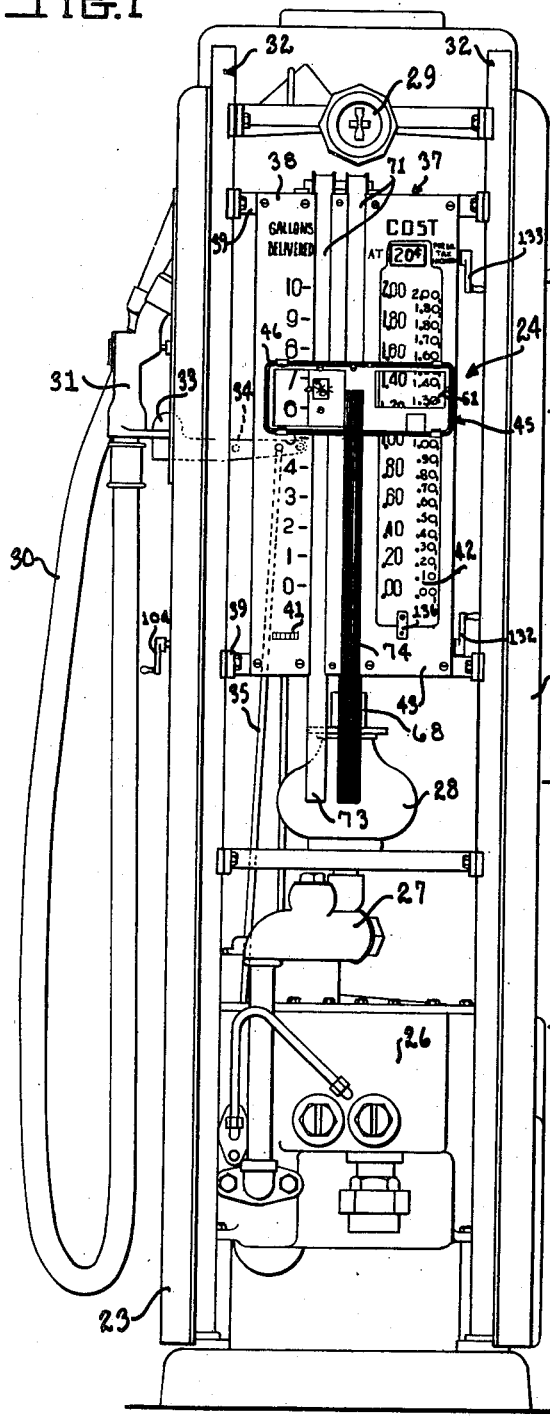

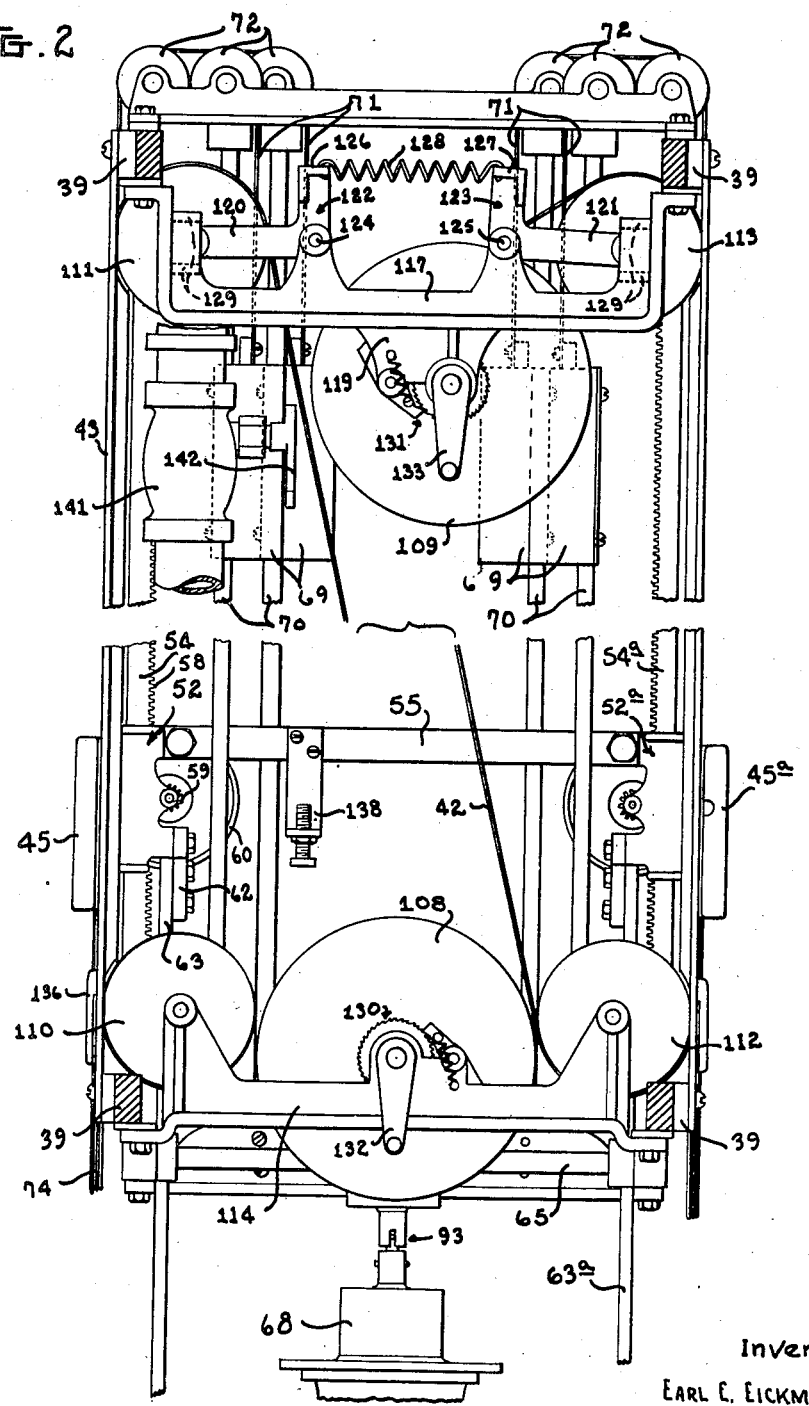

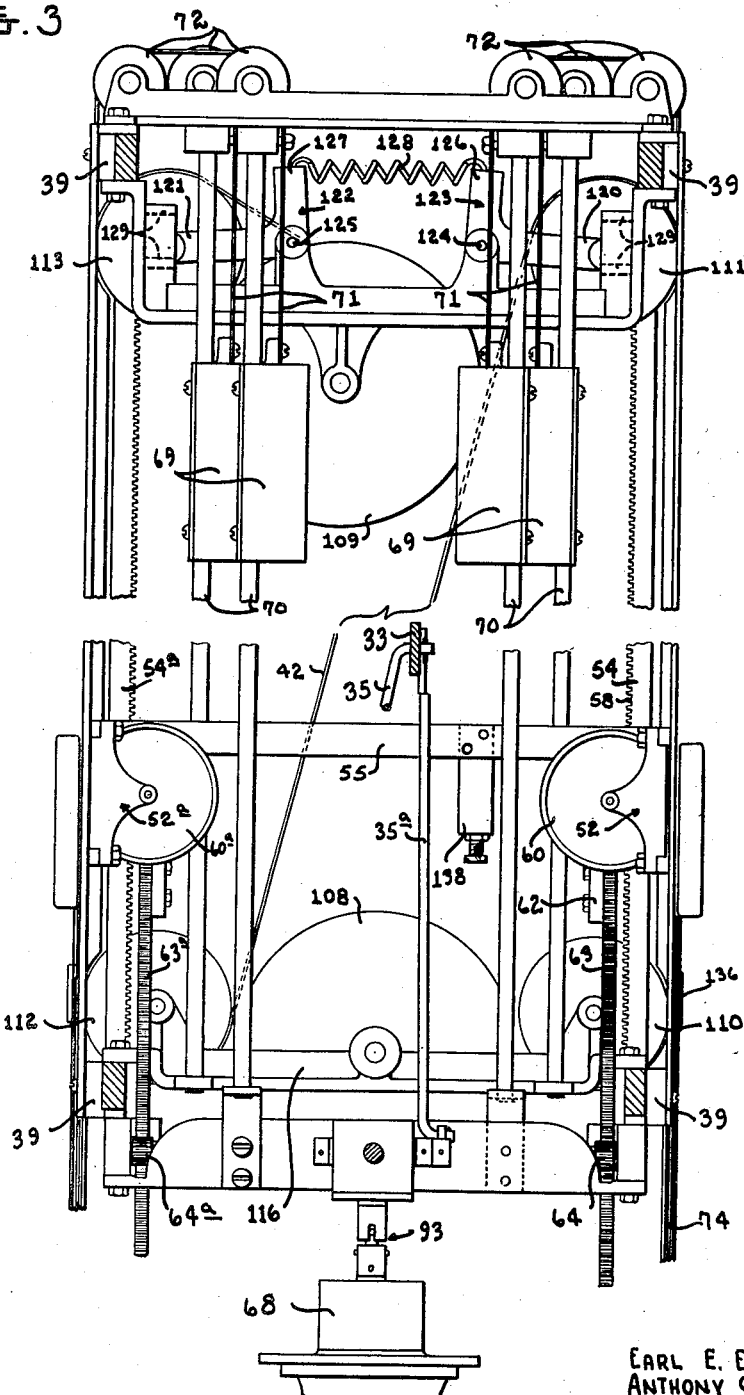

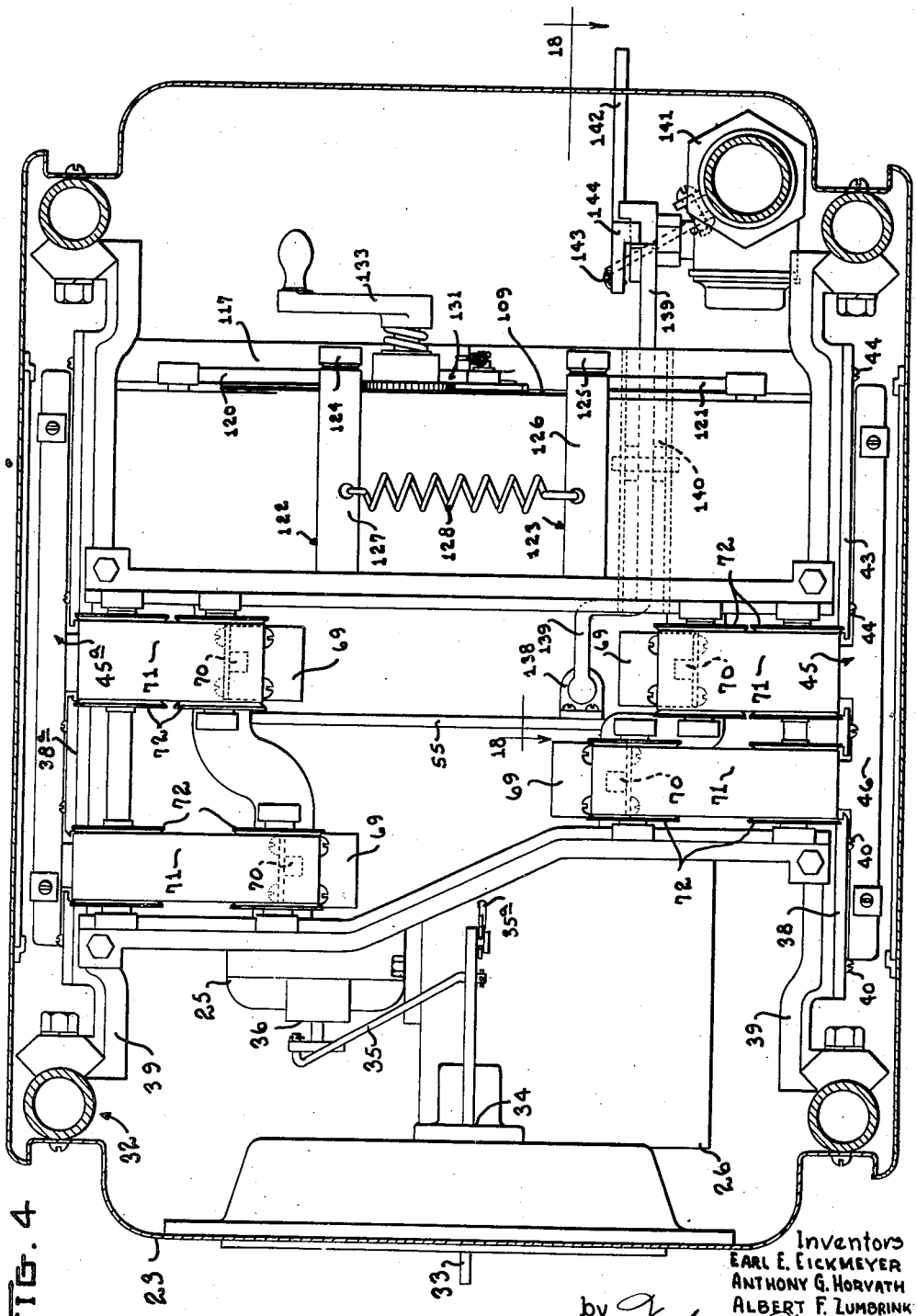

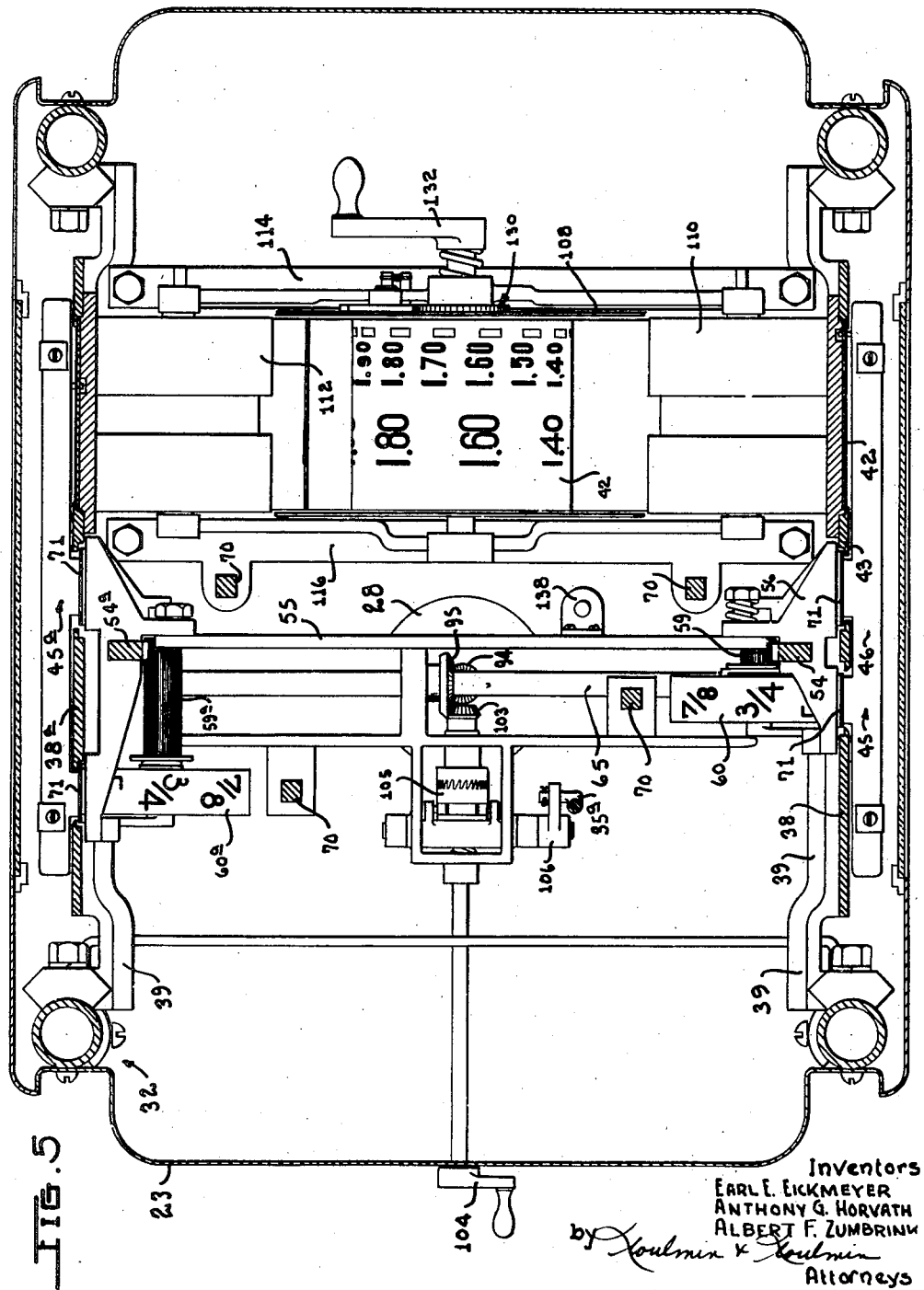

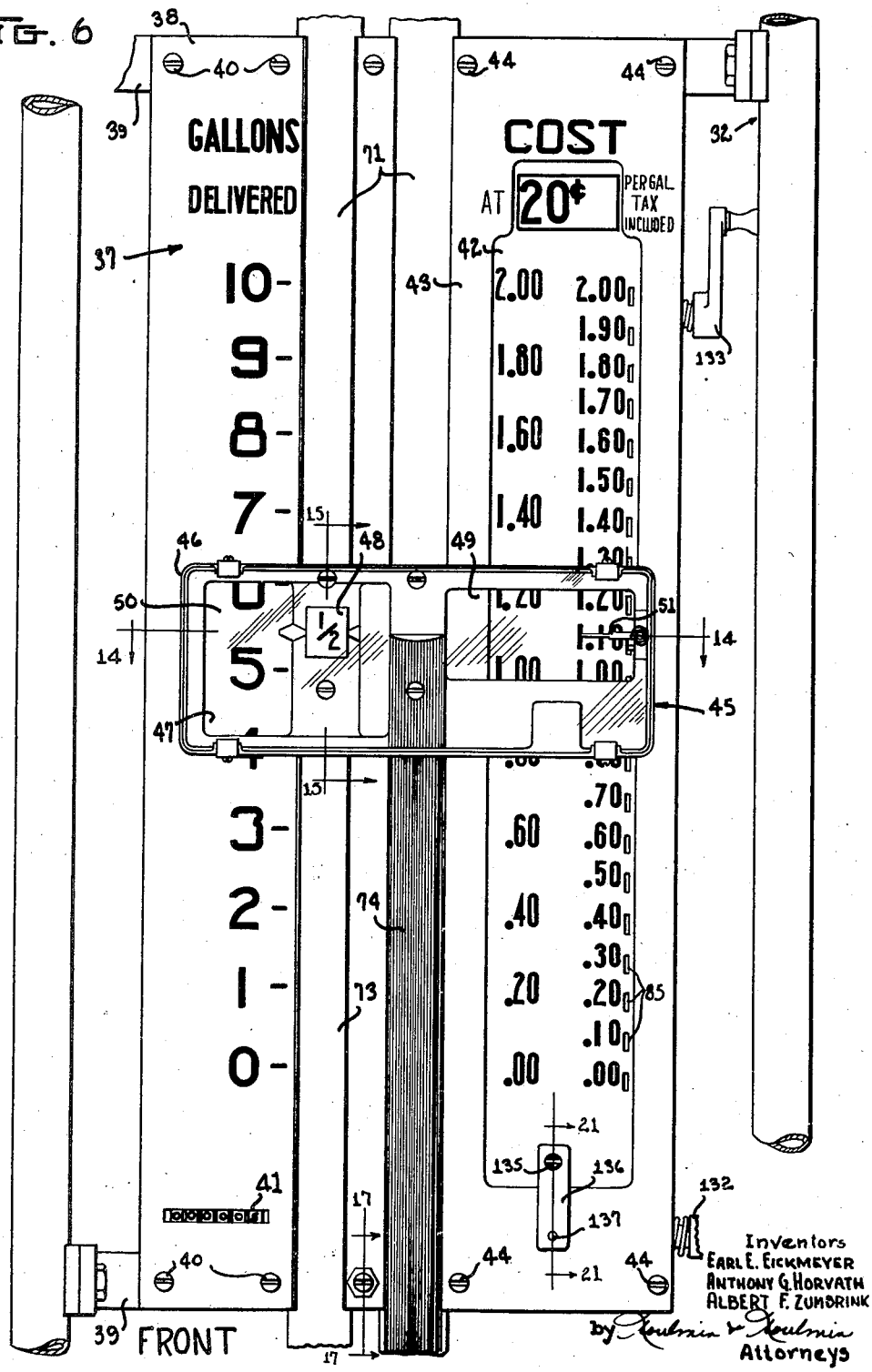

Inventors
EARL E. EICKMEYER
ANTHONY G. HORVATH
ALBERT F. ZUMBRINK
by
Attorneys

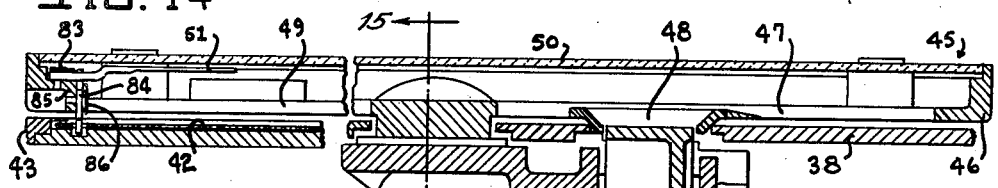

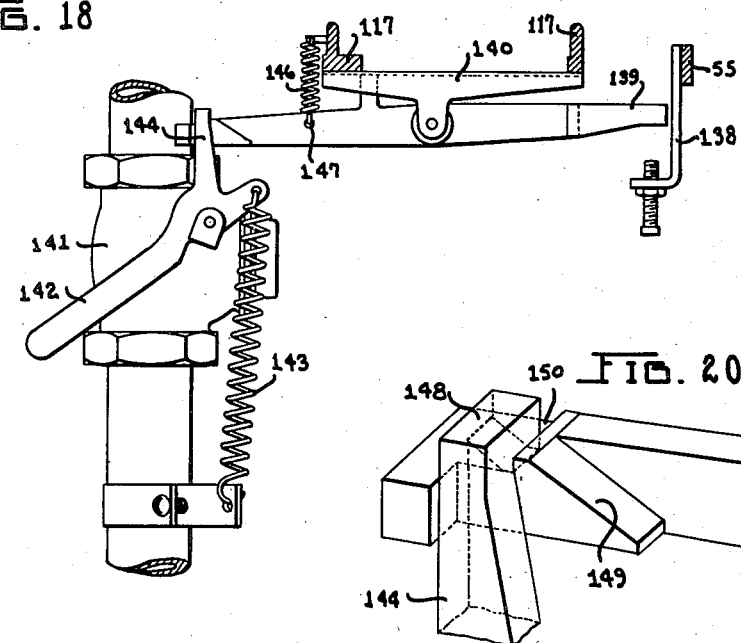
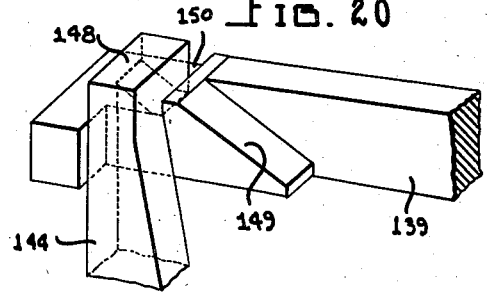
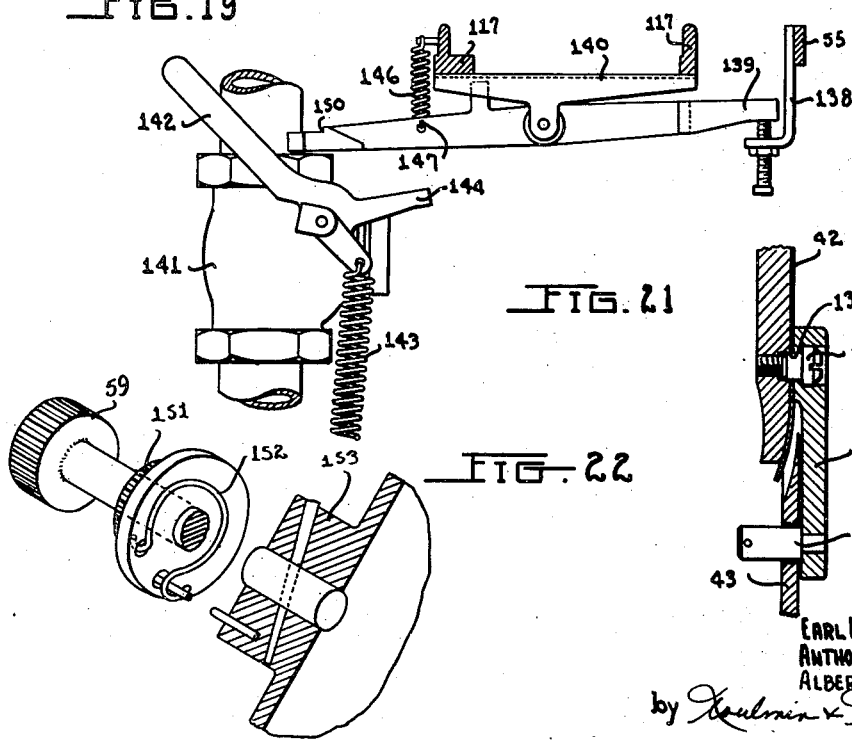
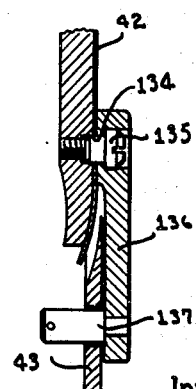

Patented May 15, 1945

2,375,903

UNITED STATES PATENT OFFICE 2,375,903

FLUID DISPENSING APPARATUS

Earl E. Eickmeyer, Anthony G. Horvath, and Albert F. Zumbrink, Dayton, Ohio, assignors to The Dayton Pump and Manufacturing Company, Dayton, Ohio, a corporation of Ohio Application July 10, 1939, Serial No. 283,530

8 Claims. (Cl. 222—23)

This invention relates to liquid dispensing apparatus of the money value computing type.

The invention provides a simple, economic and efficient device for indicating the quantity of liquid dispensed together with the price per unit amount and the total computed value of the liquid dealt out. The apparatus is particularly adapted for use in dispensing gasoline and the like fuels at filling stations of the type which include a pump and meter. The improved device herein described comprises a mechanism which is actuated by the meter for visibly indicating the number of gallons of fluid dispensed and the total computed money value thereof.

One object of this present invention is to provide a liquid fuel dispensing and price computing apparatus which will accurately and efficiently register the delivery of unit quantities of liquid of ten cent value or multiple values thereof.

Another object of this invention is to provide a liquid dispensing machine of the character described whereby the total quantity of liquid discharged in gallons or fractions thereof, and the price per unit quantity of liquid, as well as the total computed cost of the liquid dispensed, are clearly visible to the operator and consumer at all times.

Another object of this invention is to provide a liquid fuel dispensing and price computing apparatus whereby the total price of any liquid dispensed in any desired unit quantity or fractions thereof and the exact quantity delivered are visibly indicated on a dial which is adjustable to correspond to the price variations of units dispensed.

Another object of this invention is to provide a liquid dispensing device which comprises a readily visible means for indicating the quantity of liquid dispensed, the price per unit of liquid, the total computed price of the quantity of fuel dispensed in any particular service transaction and the sum total quantity of fuel dispensed by the multiple transactions.

A further object is to construct a liquid dispensing device of the character described which, upon delivery of a predetermined quantity of liquid, will automatically cut off the supply of liquid through the dispensing means until the resetting of the computing means has taken place.

A further object is to provide in a machine of this nature, means whereby the price computing mechanism can be manually reset without disengaging the meter driving connections to the price computing mechanism.

A further object is to provide means for eliminating the backlash in the gear mechanism of the quantity and price computing means.

Another object is to construct a dispensing device and indicator mechanism so that the indicating means cannot be tampered with during the dispensing operation. To effect this, means is provided for automatically disconnecting the quantity and price indicator resetting mechanism which is initiated by the removal of the fluid delivery nozzle conduit from its support and automatically connecting said mechanism on replacement of the nozzle to its initial position.

Another object is to provide an indicating mechanism which comprises means for counterbalancing the weight of moving parts to produce a smoothly operating indicator mechanism.

Another object is to provide means whereby the price per unit quantity of fluid dispensed by the apparatus can be readily changed as required comprising the use of tape having different unit price charts spaced thereon and reels for positioning the tape.

In the accompanying drawings:

Figure 1 is a front view in elevation of the liquid or fuel dispensing device of this invention;

Figure 2 is a right-hand side elevation view, partly broken away, with the side panel removed showing the quantity and price indicating mechanism and means employed for changing the unit quantity price displayed by the cost tape;

Figure 3 is a similar view of the mechanism shown in Figure 2, taken from the left side;

Figure 4 is a plan view taken on the line 4—4 of Figure 1, looking in the direction of the arrows;

Figure 5 is a similar plan view taken substantially along the line 5—5 of Figure 1 and looking in the direction of the arrows;

Figure 6 is a front elevation of the dial and reciprocable marker means for indicating the quantity and computed cost of the liquid dispensed, the associated parts being broken away so as to show the arrangement of the parts more plainly;

Figure 12:
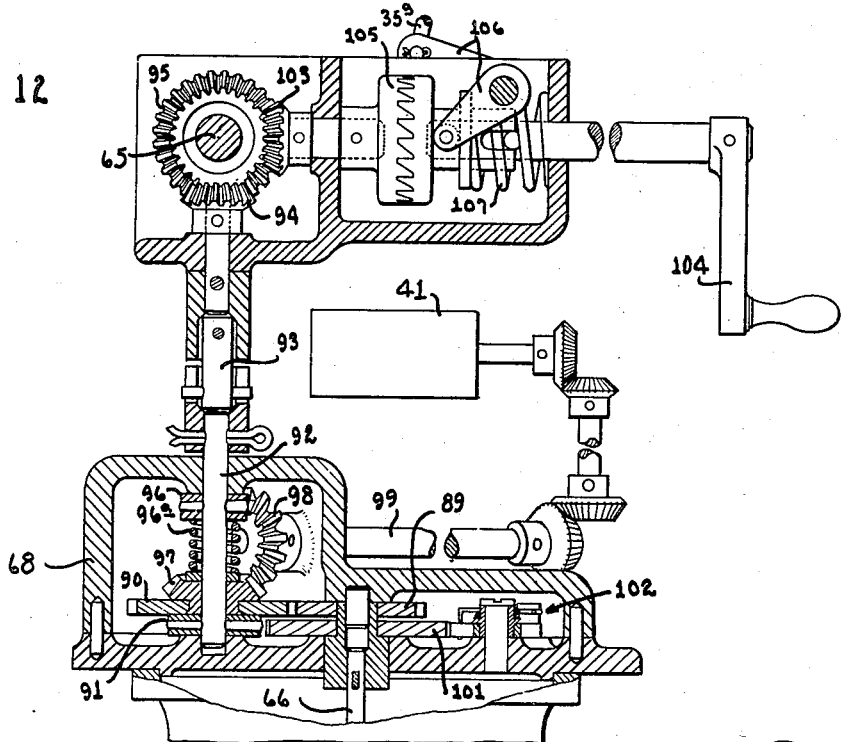
Figure 13:
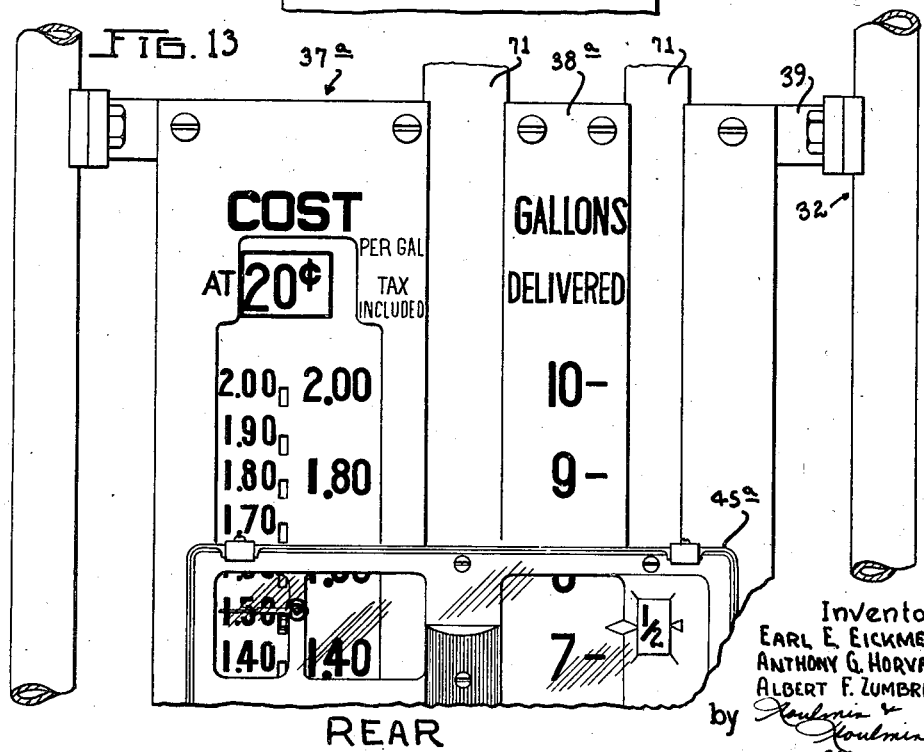

Figures 7, 8, 9, 10 and 11 inclusive are fragmentary detail views of the rotatable pawl member for indicating the dispensing of unit money value quantities of fluid;

Figure 12 is a detail vertical section taken through the friction disk clutch and manual dial resetting means, illustrating the associated cumulative quantity recording mechanism in elevation;

Figure 13 is a fragmentary view of the rear side of the dispensing pump dial showing the arrangement thereof;

Figure 14 is a detail sectional view, partly broken away, taken substantially on the line 14—14 of Figure 6 and looking in the direction of the arrows;

Figure 15 is a detail sectional view taken on the line 15—15 of Figure 14, looking in the direction of the arrows;

Figure 16 is a fragmentary view in elevation of the vertical reciprocable marker mechanism and associated stationary rack means;

Figure 17 is a fragmentary detail sectional view taken on the line 17—17 of Figure 6, showing the means for vertically adjusting the stationary rack;

Figures 18 and 19 are views in elevation of the fluid delivery cut-off valve and tripping lever assembly showing the valve in open and closed position respectively;

Figure 20 is a fragmentary detail perspective view illustrating the latch construction of the tripping lever member;

Figure 21 is a detail view in section of the price adjusting tape means and taken on the line 21—21 of Figure 6;

Figure 22 is a detail view of the backlash eliminating gear member.

Referring to the drawings in detail, the dispensing apparatus illustrated in Figures 1 to 5 inclusive comprises a vertical housing 23 having enclosed in the upper part the improved quantity and cost computing indicator mechanism of this invention. In the lower part of the chamber formed by the housing member 23 is located a motor 25 which is arranged to operate a rotary pump (not shown) for forcing the liquid or fluid being dispensed through an air separator 26, strainer 27, meter 28 of conventional design, computing mechanism 24, illuminated spinner flow indicator 29 and outward by suitable conduit connections through flexible dispensing hose 30 and nozzle 31. The assembly of the parts in the housing is maintained in proper relationship by means of the frame generally designated 32.

The nozzle 31 when not in use is normally retained at the side of the housing 23 on the end of the lever 33 which is pivoted to the frame structure as at 34. Pivotally secured to the opposite end of the lever 33 is a rod 35 which operates the on and off switch 36 (Figure 4) of the motor 25.

The weight of the nozzle 31 and attached hose ordinarily maintains the rod 35 raised so that the motor switch is held in the off position. When the nozzle is removed from the end of the lever 33, the rod 35 is permitted to descend and move the motor switch to on position. Similarly fastened to the lever 33 is a rod 35a which declutches the manual means for resetting or manipulating the indicating mechanism when the nozzle is removed from its support.

*Quantity and price computing dial mechanism*

Illustrated in Figures 1, 5, 6 and 13 is the quantity and price indicating mechanism of this invention which comprises a front and rear visible dial means generally designated 37 and 37a, respectively. The dial face comprises spaced charts of indicia, the chart to the left and designated 38 consisting of a number of equally spaced digits from 0 to 10 and denoting the unit quantities of liquid dispensed. The chart to the right and indicated at 42 shows the total price of the liquid delivered computed at the price per unit quantity as shown at the top of the cost chart. On the rear dial 37a the cost indicator chart column and quantity delivered chart indicia 38a are in reversed position as illustrated in Figure 13. In the drawings the quantity unit employed is gallons but it will be understood that other units of measure, such as quarts, pints, liters, etc., may be used if desired.

The quantity units on the dial face chart 38 and corresponding rear dial face chart 38a are expressed in whole numbers which are equally spaced from each other accurately to scale with the zero digit at the bottom and the maximum unit quantity figure at the top of the chart. The dial face chart members may be made of any suitable material which will efficiently display the numerals thereon, and are normally fixed to the upper and lower horizontal frame support members 39 by the screws 40. An opening in the lower portion of the dial face chart 38 is provided for displaying the quantity totalizing counter means 41.

The cost price indicating chart 42 is suitably displayed through an opening in the face of the fixed plate 43. Screws 44 on the extended horizontal frame support members 39 are used to secure the plate 43 in place, as illustrated in Figure 6.

The cost price chart 42 and quantity or volume indicating chart 38 are arranged so that their zero readings are at the bottom of the charts. Graduations on the price computing chart 42 preferably comprise two spaced columns of figures, one showing the total computed price of even number of gallons or unit quantities of fluid dispensed and the adjacent column of figures showing the computed price of fractional unit amounts. In my preferred embodiment accurate readings of ten cent fractions of liquid dispensed may be made, as illustrated in Figures 1 and 6. If desired, still smaller fractions may be provided for by modifying the price computing scale chart 42.

Vertically movable over the front and rear dial faces 37 and 37a are the indicator longitudinally movable pointer members generally designated 45 and 45a, respectively. The front and rear dial indicator members are of similar construction and consist of a rectangular plate 46 having spaced openings or windows 47, 48 and 49 therein arranged for displaying therethrough the even unit quantity indicia, fractional quantity and total computed price value of the liquid dispensed. In the rear indicator 45a the windows are arranged to accommodate the changed position of the dial charts; otherwise the construction is the same.

In a frame or outer rim portion of the indicator is fitted a transparent sheet or panel 50, as shown in Figure 14. The transparent sheet member 50 is suitably spaced from the face of the plate 46 as illustrated in Figure 14 so as not to interfere with the reciprocable pointer member 51 which cooperates with the price computing indicia scale 42 to indicate the dispensing of ten cent unit quantities of liquid, as hereinafter described.

Indicator members 45 and 45a are fastened at the rear to slidable indicator bracket members 52 and 52a respectively by means of machine screws 53. Bracket members 52 and 52a move vertically along the fixed gear racks 54 and 54a respectively. The indicator bracket members 52 and 52a are of similar construction and are fastened together by means of the crossbar 55, as illustrated in Figure 2.

Referring to Figures 14, 15 and 16, it will be observed the indicator bracket comprises a flanged head member 56 having a central aperture 57 through which extends the fixed gear rack 54. Gear teeth 58 on this rack are engaged by an idler pinion gear 59 which is attached to the shaft of the drum 60 so that the drum is rotated when the bracket is moved up or down the fixed rack 54. The shaft of the drum 60 is suitably mounted in the bracket head, as shown in Figure 14. On the surface of the drum 60 are carried the fractional gallon indicia which are accurately spaced so that the correct fractional readings will be displayed through the window 48 of the indicator 45 as it is moved vertically. Spring means 61 permits the bracket to yield transversely as it moves along to conform with the shape of the fixed rack.

Attached to the slidable head member 56 is a T-shaped plate 62 to which is secured the gear rack 63, as shown in Figure 16. A similar member is disposed at the back of the rear dial face of the indicating mechanism. Pinion gears 64 and 64a on the end of the transverse shaft 65 are arranged to move the indicator bracket head members 56 and 56a together with the attached indicator members 45 and 45a vertically along the fixed racks 63 and 63a, respectively, as will be noted in Figure 3. Shaft 65 which is suitably secured to the fixed frame member 39 is rotated by the meter shaft 66 connected thereto through the gear box 68, as shown in Figure 16.

Counterbalancing mechanism

To provide a smoothly operating mechanism, counterbalancing weights generally designated 69 are slidably attached to vertically disposed rod means 70 which are to act as guides during the vertical movement of the weights. Flexible metal tape members generally designated 71 are connected in pairs to each of the reciprocable indicator bracket members and a counter-balancing weight as illustrated in Figures 2 and 3. The tape means are drawn over the respective pulley wheels 72 and are suitably secured to the indicator bracket members 45 and 45a respectively by screws 53, as shown in Figure 15. The flexible tape members 71 also provide means for covering the vertical slots in the face of the dial which slots are required to permit vertical movement of the indicator and associated mechanism.

For covering the opening below the indicators, similar tape or extended strip means 73 and 74 are likewise fastened to the indicator and extend downward therebeneath, as shown in Figure 6. Preferably the central tape 74 has a spherical outer surface and is brightly colored so as to accentuate the movement of the indicator over the dial.

Slight adjustment of the fixed rack 54 is provided for by the screw 75 as illustrated in Figure 17. The pin 76 on the end of the screw engages in a notch 77 in the back of the rack so that upon rotating the screw 75 the rack will be moved vertically. A lock nut 78 is employed for securing the screw against movement after proper adjustment has been made. The rack 54 is fastened at its ends to the frame member 39 by means of the pins 80 which are positioned in the elongated aperture 81, as shown in Figure 17. Movement of the fixed rack 54 results in rotation of the fractional drum 60 so that proper alignment of the fractional gallon indicator indicia can be accomplished to initially set the mechanism for accurately indicating the quantity of fluid dispensed.

Mechanism to indicate dispensing of ten cent unit quantities of liquid

This mechanism, as shown in Figures 6 to 11 inclusive and 14, comprises a pointer 51 which is pivoted to the indicator plate 46 as at 83. A pawl 84 is arranged to engage in the spaced holes 85 of the cost tape and hold the pointer in a horizontal position as illustrated in Figures 6 and 8. The holes 85 are accurately spaced to scale and calibrated with the meter so that when the pointer 51 has moved from one horizontal position adjacent one of the holes 85 to the next, a volume of liquid of ten cent value will have been dispensed.

The pawl 84 is pivotally secured to the flange 85 of the plate 46 by means of the screw 86. Attached to the screw 86 on the outward end of the pawl is a coil spring 87 which normally urges the pawl in engagement with the holes 85. Lengthwise movement of the pawl is provided for by the elongated slot 88 permitting the pawl to move backward, as shown in Figure 10, when necessary.

Mechanism for resetting the indicator to zero

In Figures 5 and 12, clutch means is illustrated which permits the resetting of the indicators to zero reading without disconnecting the meter drive shaft from the indicator. As shown, the meter drive shaft 66 drives the shaft 65 to elevate the indicators 45 and 45a through the gear train 89, 90, friction disk means 91, shaft 92, universal 93 and bevel gears 94 and 95. The latter gear is keyed to the shaft 65. Gear 90 drives the shaft 92 through the friction disk member 91 which is fastened to the shaft 92.

Adjacent the top wall of the gear box 67 there is positioned another disk member 96 which is also secured to the shaft 92. A coil spring 96a is interposed between the disk 96 and the gear 97 which maintains the gears 97, 90 and friction disks 91 firmly together so that the gear 90 and shaft 92 and associated parts will rotate in unison. The bevel gear 97 meshes with gear 98 keyed to the shaft 99 which drives the quantity totalizing counter means 41. Gears 89 and 90 are prevented from rotating counter to the direction in which they are rotated by the meter shaft 66 by the ratchet wheel 101 and engaging spring pressed pawl means generally designated 102. Preferably multiple sets of different size teeth and engaging pawls are arranged on the wheel 101 to eliminate back play.

Manual rotation of the shaft 65, as when returning the indicator mechanism to zero, is accomplished by revolving the pinion gear 103 by means of the crank 104 through the clutch mechanism 105. When the fluid delivery nozzle 31 is supported on the lever 33 the clutch parts are engaged as shown in Figure 12. Upon lifting the nozzle 31 off the end of the lever 33 rod 35a reciprocates the bell crank 106 against the spring 107 declutching the shaft 103a to which the gear 103 is keyed so that it cannot be rotated by turning the crank 104. This declutching occurs when the hose nozzle 31 is disengaged from the lever 33 which allows the rod 35a to descend declutching the member 105 as heretofore mentioned.

Price computing tape changing means

To provide for different price ranges of unit quantities of liquid to be dispensed the price computing tape 42 is made of sufficient length to have retained thereon a plurality of price charts. These charts are accurately laid out on the tape and are moved in position in front of the dial windows. The tape is wound back and forth on the spaced reels 108 and 109, as illustrated in Figure 2, to position the desired price chart in the dial windows. It will be understood that the various price charts will be made in pairs and spaced so as to be readily positioned in the windows of the opposed dial faces.

When installing the cost price tape one end may be fastened to the reel 108 and the tape drawn around under guide roll 110 up beneath the front dial window, then over the top of the guide roll 111, downward under guide roll 112, up beneath the rear dial window, thence over guide roll 113 and finally around the reel 109, as illustrated in Figures 2 and 3.

Referring to Figure 2, reel 108 and guide rolls 110 and 112 positioned at the bottom of the indicator mechanism have their respective shafts rotatably mounted in the bracket 114 which suitably extends from the front to the rear side of the device. This bracket is bolted at the ends to the frame members 39. The opposite end of the axle shaft of the reel 108 and guide rolls 110 and 112 is journaled in the support 116. Near the top of the machine the reel 109 and cost tape guide rolls 111 and 113 are journaled in a U-shaped bracket 117, the ends of which are fastened to the frame support means 39. Reel 109 is rotatably mounted in the depending journal portion generally designated 119 of the bracket 117.

Guide rolls 111 and 113 are mounted on the horizontally extended arms 120 and 121 respectively of the bell crank members generally designated 122 and 123, which are in turn pivotally supported to the upstanding flange members on the bracket 117 as at 124 and 125 respectively. The opposed bell crank arms 126 and 127 are yieldably urged toward each other by the spring 128 which tends to raise the cost tape guide rolls 111 and 113 upward guiding the tape. Movement of the guide rolls 111 and 113 is restricted by the spaced lugs 129 positioned on the bracket 117 adjacent the axle shafts of said guide rolls. The reels 108 and 109 are provided with ratchet and pawl means generally designated 130 and 131 for locking the reels in position after the cost tape has been adjusted to prevent loosening or unrolling of the same. Hand cranks 132 and 133 extend outward at the side of the indicator mechanism to provide means for rotating the reels to position the tape.

In order to accurately position the cost tape in place in the windows of the dials, an aligning aperture 134 is positioned in the tape below the chart, as shown in Figures 6 and 21, in which is engaged a set screw 135. This screw is retained in the link 136 which is pivoted beneath the window of the dial as at 137. After positioning the screw means 135 the reel 109 is rotated to draw the cost tape taut. As illustrated in Figure 5, the idler pinion 59a is of elongated construction to permit the proper positioning of the fractional gallon drum 60a on the opposed or rear dial face arranged as shown in Figure 13.

*Automatic fuel delivery valve cut-off mechanism*

On the crossbar 55 interconnecting the vertically moving indicator members 45 and 45a is fixed an adjustable screw member 138 which is adapted to contact the outer end of the rock bar 139 when the indicator members have moved to the top of the dials, indicating the delivery of the maximum quantity of liquid computable on the dial chart. The bar 139 is pivoted to the member 140 and is adapted to yieldably maintain the valve 141 open by latching the hand lever 142 controlling the valve in open position. Spring means 143 is fastened to the lever 142 and automatically closes the valve when the bar 139 is rocked so as to free the end of the bar from the arm 144 of the lever 142, as shown in Figures 18 and 19. The member 140 which supports the lever 139 is fastened to the frame members 117. Spring means 146 is attached to the bar 139, as at 147, and normally maintains the rock bar 139 in position to be latched to the lever arm 144. The latch is preferably constructed as shown in Figure 20 and comprises a hook-like projection 148 on the end of the lever arm 144. The hook is adapted to slide over the beveled flange extension 149 on the bar 139 and engage in the notch 150 adjacent the end of the bar.

*Backlash eliminator*

For eliminating the backlash or play between the teeth of the gear 59 in the indicator and the fixed rack 54 the gears are of split construction as shown in Figures 14, 16 and 22. The inner gear portion 151 is attached to a coil spring 152, the end of which is secured to the collar 153 and yieldably forces the teeth of the gear in contact with the teeth on the rack. In this manner the gears are made to fit snugly together taking up the play between the teeth and produce a steady operating indicator mechanism.

In operation it will be understood after adjusting the cost tape on the dials to correspond to the prevailing unit price of the liquid dispensed, the apparatus is ready to be operated in the usual manner by removing the hose nozzle and opening the nozzle valve. Rotation of the meter shaft 66 drives the shaft 65 and attached pinions to elevate the indicator members 45 and 45a over the opposed dial faces in accordance with the fluid passing through the meter and being delivered. It will be observed that in order to manually reset the indicator mechanism to zero reading it is necessary to first return the hose nozzle to its support. This prevents manipulation or interference with the indicator mechanism during the dispensing operation.

The above description of this invention constitutes one embodiment thereof, but it is to be understood that this invention is not limited to the details of construction as various modifications will occur to persons skilled in the art.

Having thus fully described our invention, what we claim as new and desire to secure by Letters Patent is:

1. In liquid dispensing apparatus having flow establishing means and liquid metering means, indicating means movable by the liquid metering means from an initial position in proportion to the amount of liquid passed through the metering means, means comprising a valve for automatically cutting off the supply of liquid from the flow establishing means when the maximum quantity of liquid readable on the indicating means has been dispensed, and means requiring the resetting of the indicating means and automatic valve cut-off mechanism before the flow of liquid can be re-established through the dispensing means.

2. In an indicating mechanism, a fixed chart having indicia thereon for indicating unit quantities, movable chart means adapted to be fixedly arranged adjacent and spaced from said quantity indicating chart for showing cost corresponding to the amounts shown on the quantity chart, indicator means simultaneously movable over said quantity and cost charts for indicating the quantity and the cost, said indicator means including a rotatable member for co-operating with said quantity indicating chart for indicating fractional unit quantities, said cost showing means comprising a plurality of different price indicating charts laid out in spaced relationship on a common movable base, and means for adjustably positioning said base member to display the desired chart whereby the cost of the quantity indicated can be displayed at the prevailing price per unit quantity.

3. In indicator mechanisms for liquid dispensing apparatus, the combination of a fixed chart for displaying unit quantities of liquid dispensed, a price computing chart arranged adjacent thereto for displaying the computed money value corresponding to the total amount of liquid dispensed up to a certain amount, and means movable over said charts in proportion to the amount of liquid dispensed starting from a zero reading for simultaneously indicating the quantity of liquid dealt out and the total computed price thereof, said indicating means including means operably engaging said price computing chart for accurately indicating the delivery of small fractional money value quantities of liquid.

4. In liquid dispensing apparatus having liquid flow establishing means, metering means, conduit means connected to said metering means, flexible hose including a nozzle means connected with said conduit for dispensing liquid, a support for said flexible hose and nozzle means, indicator means movable in proportion to the amount of liquid passed through said metering means, means operable to return the indicator means to initial position only after positioning the delivery hose means on its support, means to prevent the operation of the indicator resetting means while said delivery means is removed from its support, valve means in said conduit for controlling the flow of liquid to said hose and nozzle means, and means operatively associated with said indicator to actuate the automatic closing of said valve stopping the flow of liquid to said hose upon delivery of the maximum quantity of liquid capable of being indicated by said indicator.

5. In a fluid dispensing mechanism, a fixed quantity indicating chart, a price computing chart, said price computing chart being adjustable relative to said quantity chart, an indicator means simultaneously movable over said quantity and price computing chart, means for moving said indicator from an initial position in proportion to the quantity of fluid dispensed during a transaction, and a movable fractional quantity indicating means associated with said movable indicator means and co-operating with said fixed quantity indicating chart to indicate the fractional amounts of liquid dispensed together with the unit amounts, said indicator visibly indicating the quantity and total computed price of the fluid dealt out.

6. In an indicating mechanism, means comprising an adjustable tape having a cost chart and a price thereon for display, a separate chart located adjacent to said tape for indicating quantities, means movable over said charts for indicating quantity and the cost and price thereof, means carried by said indicating means for indicating smaller price units, and means comprising adjustable reels and yieldable guide rolls for positioning said tape.

7. In indicator mechanism, the combination of means for indicating unit quantities comprising a chart, means rotatably associated therewith and whose axis moves in a path which is parallel to said unit quantity indicating means for indicating fractional unit quantities.

8. In an indicating apparatus, means for indicating quantity and computed price, said means comprising a chart for displaying unit quantity indicia for representing unit amounts, a separate price computing chart arranged adjacent thereto and spaced therefrom, indicator means movable simultaneously over both charts for indicating the quantity and total computed price values, and means associated with said indicator for denoting fractional unit quantities.

EARL E. EICKMEYER.
ANTHONY G. HORVATH.
ALBERT F. ZUMBRINK.